(12) United States Patent
Aubry et al.

(10) Patent No.: US 11,593,381 B2
(45) Date of Patent: Feb. 28, 2023

(54) RE-COMPUTING PRE-COMPUTED QUERY RESULTS

(71) Applicant: Amadeus S.A.S., Biot (FR)

(72) Inventors: Jean-Philippe Aubry, Brookline, MA (US); Guillaume Le Grand, Le Cannet (FR); Johann Marchi, Nice (FR); Nicolas Legrand, Nice (FR)

(73) Assignee: Amadeus S.A.S., Biot (FR)

( * ) Notice: Subject to any disclaimer, the term of this patent is extended or adjusted under 35 U.S.C. 154(b) by 1209 days.

(21) Appl. No.: 15/879,654

(22) Filed: Jan. 25, 2018

(65) Prior Publication Data
US 2019/0228094 A1 Jul. 25, 2019

(51) Int. Cl.
*G06F 16/2455* (2019.01)
*G06N 20/00* (2019.01)
*G06F 16/2453* (2019.01)
*G06F 16/903* (2019.01)

(52) U.S. Cl.
CPC .... *G06F 16/24566* (2019.01); *G06F 16/2453* (2019.01); *G06F 16/90335* (2019.01); *G06N 20/00* (2019.01)

(58) Field of Classification Search
CPC ......... G06F 16/24566; G06F 16/90335; G06F 16/2453; G06N 20/00
See application file for complete search history.

(56) References Cited

U.S. PATENT DOCUMENTS

| 7,707,131 B2* | 4/2010 | Chickering ............ G06N 20/00 706/45 |
| 8,429,097 B1* | 4/2013 | Sivasubramanian ...................... G06F 16/2282 706/12 |
| 2004/0034633 A1* | 2/2004 | Rickard ................ G06F 16/951 |
| 2005/0234971 A1 | 10/2005 | Folkert et al. |

(Continued)

FOREIGN PATENT DOCUMENTS

EP    2913764 A1    9/2015

OTHER PUBLICATIONS

Sutton et al., "Reinforcement Learning: An Introduction" MIT Press, Cambridge, MA, 1998.

(Continued)

*Primary Examiner* — Syed H Hasan
*Assistant Examiner* — Anthony G Gemignani
(74) *Attorney, Agent, or Firm* — Thompson Hine LLP

(57) ABSTRACT

Pre-computed query results stored at a database server are re-computed by a computation machine. The pre-computed query results are composed of a plurality of shares. Each share includes a certain number of pre-computed query results. The computation resources of the computation machine needed to re-compute a pre-computed query result of a first share depend on whether or not other pre-computed query results of the first share are re-computed during a given time interval forming a current re-computation cycle. The computation machine receives a request to re-compute pre-computed query results of at least a first share, deter- (Continued)

mines a number of pre-computed query results in the first share to be re-computed in the current re-computation cycle based on a Reinforcement Learning algorithm, and re-computes the determined number of pre-computed query results in the first share.

16 Claims, 10 Drawing Sheets

(56) References Cited

U.S. PATENT DOCUMENTS

| | | | | |
|---|---|---|---|---|
| 2008/0256061 | A1* | 10/2008 | Chang | G06Q 30/0256 |
| | | | | 707/999.005 |
| 2012/0209794 | A1* | 8/2012 | Jones, III | G06N 20/00 |
| | | | | 706/12 |
| 2014/0280028 | A1 | 9/2014 | Ding et al. | |
| 2015/0234890 | A1* | 8/2015 | Legrand | H04L 67/10 |
| | | | | 707/769 |
| 2015/0310068 | A1* | 10/2015 | Pickens | G06Q 10/10 |
| | | | | 707/694 |
| 2015/0377849 | A1* | 12/2015 | Masson | G01N 33/0027 |
| | | | | 702/24 |
| 2017/0140053 | A1* | 5/2017 | Vorobev | G06F 16/24578 |
| 2017/0358285 | A1* | 12/2017 | Cabral | G10H 1/0025 |

OTHER PUBLICATIONS

Krishnan et al., "Stale view cleaning", Proceedings of the 41st International Conference on Very Large Data Bases, Kohala Coast, Hawaii, vol. 8, Issue 12, Aug. 2015, pp. 1370-1381.

European Patent Office, International Search Report issued in International Application No. PCT/EP2019/051865 dated Mar. 7, 2019.

* cited by examiner

RE-COMPUTING PRE-COMPUTED QUERY RESULTS

TECHNICAL FIELD

The present invention generally relates to database technology and, more specifically, is directed to re-computing pre-computed search results stored as database records.

BACKGROUND

A common problem in database technology is to ensure short response times to database queries or requests which require complex, long and resource-intensive processing, e.g., due to large volumes of data. For example, such computing-power consuming processing has to be performed in response to so-called "open queries" which contain only little input information (e.g., only one or two parameters out of a dozen possible parameters are specified and/or the specified value ranges of the parameters are broad) and, consequently, lead to a large number of results in general. Possibilities to speed up data processing by increasing hardware performance are limited. Thus, attention is drawn to improving the mechanisms underlying the complex, long and resource-intensive processing in order to respond to such queries.

One general approach to shorten response times is to prepare results to be returned in response to expected requests (e.g., by pre-computing or pre-collecting such results) and to maintain the corresponding query results in a pool of pre-computed query results. Requests are then actually not processed and responses on the basis of the large original data basis, but are directed to the pool of pre-computed query results.

Re-computing a large number of pre-computed query results is a task consuming a substantial amount of computation resources. Thus, re-computation mechanisms are sought to efficiently perform the re-computation of pre-computed query results.

SUMMARY

According to an embodiment, a computation machine for re-computing pre-computed query results stored at a database server is provided. The pre-computed query results are composed of a plurality of shares. Each share includes a certain number of pre-computed query results. The computation resources of the computation machine needed to re-compute a pre-computed query result of a first share depend on whether or not other pre-computed query results of the first share are re-computed during a given time interval. The given time interval forms a current re-computation cycle. The computation machine is arranged to receive a request to re-compute pre-computed query results of at least a first share. The computation machine is further arranged to determine a number of pre-computed query results in the first share to be re-computed in the current re-computation cycle based on a Reinforcement Learning algorithm. The determined number of pre-computed search results is limited by the computation machine's computation resources available during the given time interval. The computation machine is further arranged to re-compute the determined number of pre-computed query results in the first share.

According to an embodiment, a corresponding method executed by a computation machine is provided. The method is directed to re-computing pre-computed query results stored at a database server. The pre-computed query results are composed of a plurality of shares. Each share includes a certain number of pre-computed query results. Computation resources of the computation machine needed to re-compute a pre-computed query result of a first share depend on whether or not other pre-computed query results of the first share are re-computed during a given time interval forming a current re-computation cycle. The method includes receiving a request to re-compute pre-computed query results of at least a first share and determining a number of pre-computed query results in the first share to be re-computed in the current re-computation cycle based on a Reinforcement Learning algorithm. The determined number of pre-computed search results are limited by the computation resources of the computation machine that are available during the given time interval. The method further includes re-computing the determined number of pre-computed query results in the first share during the re-computation cycle.

According to an embodiment, a computer program stored on a storage medium is provided which, when executed by a computation machine, equips the computation machine with the corresponding functionality set forth above.

The above summary may present a simplified overview of some embodiments of the invention in order to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention. Similar reference numbers generally indicate identical or functionally similar elements.

DETAILED DESCRIPTION

In order to be able to handle database queries or batch computation requests which require computations on the basis of large volumes of underlying data, search results corresponding to expected queries are generally pre-computed and stored as database records in a database. This database is queried by requesting entities (such as clients, applications, browsers installed on user terminals, etc.) in the course of a search and pre-computed search results fulfilling search criteria indicated by the query are returned to the client in response to the query. Subsequently, the term "query" is used as a general term including any type of information retrieval requests such as transactional queries, requests for batch computations and other forms.

Figure 1:
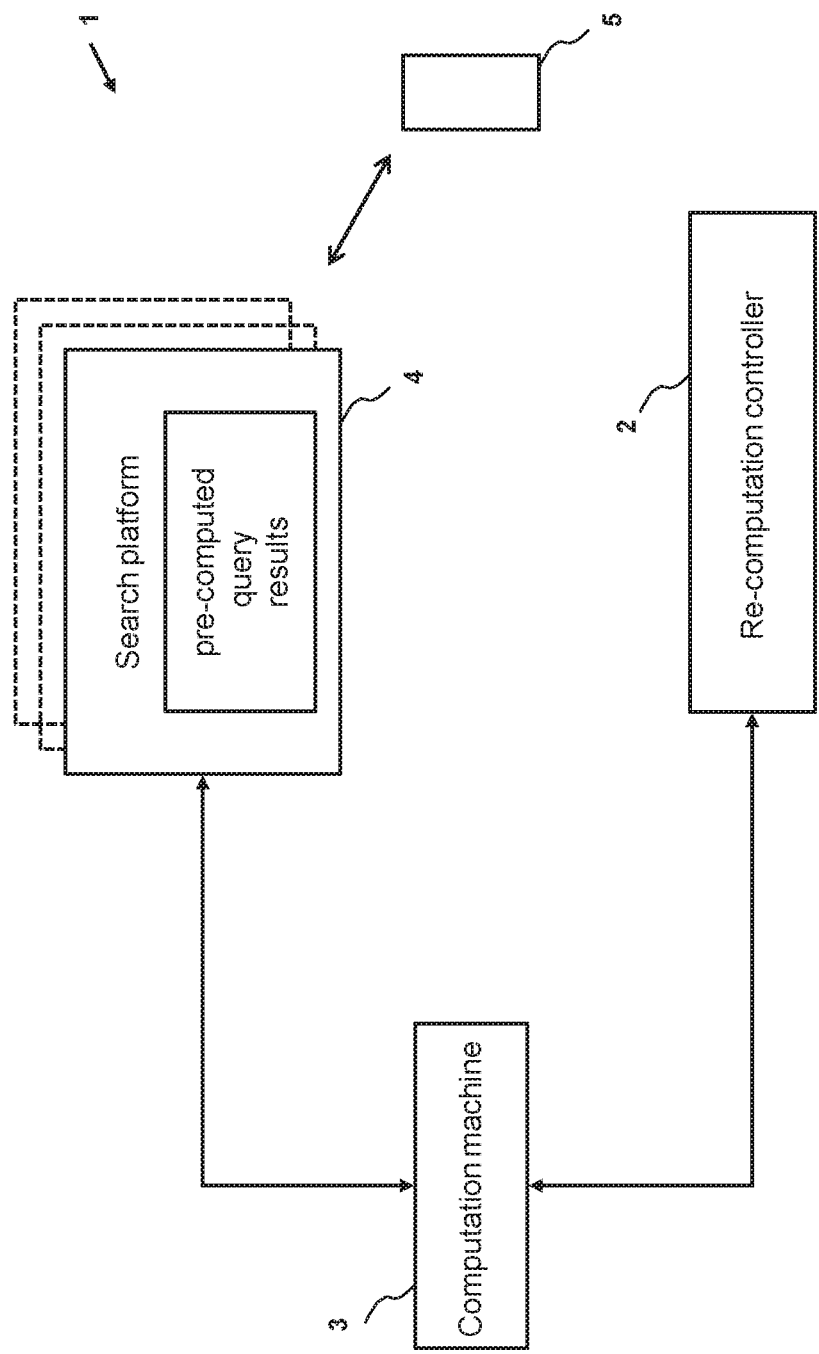
FIG. 1 schematically depicts an example of a distributed database system maintaining pre-computed query results.

FIG. 1 illustrates such a database environment 1 on an abstract level. Basic data, hereinafter also referred to as "calculation data", is kept in and/or accessed by a computation machine 3 which is connected to a re-computation controller 2. The latter one issues re-computation orders to the computation machine 3 which, in turn, transmits the corresponding results to the search platform 4 and, in addition, to the re-computation controller 2 which also maintains the pre-computed search results for reasons of re-computation control. End users 5 such as applications on user terminals access the pre-computed search results from the search platform 4. As indicated by FIG. 1, one or several search platforms 4 may be present in environment 1. If a plurality of search platforms 4 is present, the pre-computed search results may be maintained in a distributed manner over the several search platforms 4 and re-computation controller 2 may control the re-computation of all pre-computed search results distributed over search platforms 4. The search platform 4 may also offer a heterogeneous set of pre-computed search requests, e.g., some search platforms 4 maintain pre-computed search requests relating to air travel, other search platforms 4 stored pre-computed search request related to insurances and other search platforms 4 keep pre-computed (or pre-crawled) search requests related to Internet websites. Such a heterogeneous environment may be controlled by one single re-computation controller 2 or by a plurality of re-computation controllers 2. Alternatively, the plurality of search platforms 4 may be utilized to mirror the same pre-computed search results, for example, for reasons of redundancy.

The approach of pre-computing search results and storing them in the search platform accessible to querying clients leads to the general situation that the calculation data may change over time and, thus, the pre-computed search results get outdated or invalid (both terms are used synonymously herein). Pre-computed search results which are still up-to-date, i.e., which match the corresponding real-time computation equivalents (results which would be actually computed on demand without having pre-computed search results available), are called "accurate" pre-computed search results hereinafter. Thus, when the search platform keeping the pre-computed search results correctly represents the current state of the data domain underlying the cached query results, i.e., the calculation data, the pre-computed search results stored in the search platform are—in general—accurate.

Generally, to enable the search platform to return correct results, one wants to maintain a high degree of correlation between pre-computed search results which are provided to the querying entity in response to database queries and their real-time computation equivalents. At the same time, however, it is desirable to minimize computation resource consumption caused by re-computations, i.e., to avoid any unnecessary re-computations such as re-computation of still accurate cached query results. Computing resources are limited and, generally, there are not enough computing resources to re-compute all pre-computed search results at all times. Thus, a trade-off between pre-computed query results accuracy and utilization of the available computing power is to be found.

Figure 2:
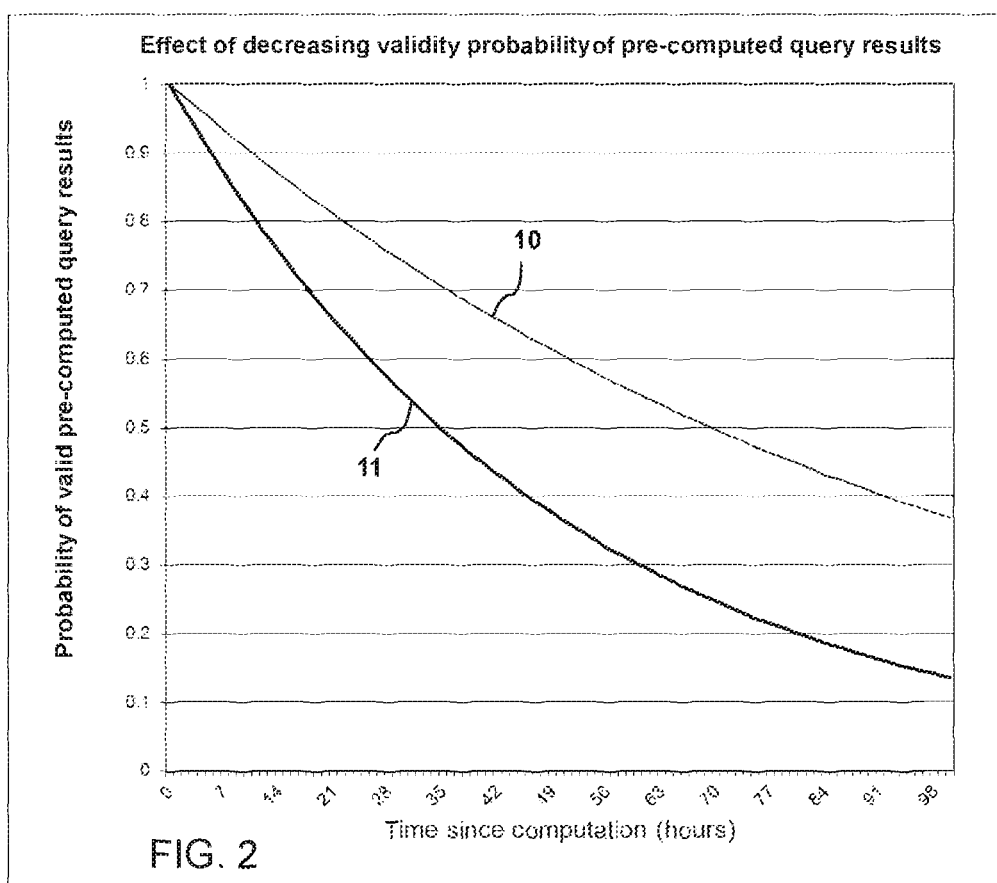
FIG. 2 visualizes an effect of decreasing validity probability of pre-computed query results over time.

In order to render re-computation more efficient, metrics are defined to evaluate how "necessary" or "unnecessary" a re-computation is. For instance, it is not worth reshooting an entire massive pre-computation every day if less than half of the computed query results turn out to be outdated. On the other hand, if particular classes of query results are known to change frequently, re-computing them several times per day might be beneficial for the accuracy. Consequently, an effective way of assessing or estimating search result accuracy is needed, generally taking into account both the associated gain on accuracy and the cost of re-computation. To this end, some mechanisms model the decreasing validity of pre-computed query results over time. Two exemplary functions of this probable accuracy decreasing over time are depicted by FIG. 2. Function 10 represents a pre-computed search result which potentially remains more accurate (or, more correctly, stays at a higher probability of being valid over time) than another pre-computed search result associated with function 11. For example, the pre-computed search result represented by function 10 has 70% probability of being still valid at 35 hours after its last re-computation, while the other pre-computed search result characterized by function 11 is only valid up to about 50% at 35 hours after its latest re-computation. Functions 10 and 11 may also represent whole sets of pre-computed search results and then indicate proportions of the sets of pre-computed search results likely being valid at a time passed since the last re-computation of the set.

Often, considerations of re-computing pre-computed query results assume that re-computation of any pre-computed search result by the computation platform 3 requires substantially the same amount of computation resources irrespective of whether the pre-computed search results are computed separately, together with related pre-computed query results (e.g., same origin, destination and adjacent dates) or any other unrelated query results. In practice, however, this assumption cannot be made in general because, for example, certain pre-computed query results and/or their corresponding underlying calculation data are interrelated to each other. Re-computing such interrelated pre-computed query results together (i.e., within the same re-computation cycle) could include synergetic effects and may thus be more efficient than re-computing them separately. Thus, when interrelated pre-computed query results are re-computed together the computation costs per individual pre-computed query result is generally less than the computation cost per individual pre-computed query result required if they are re-computed separately, i.e., in different re-computation cycles.

To promote understanding of interrelated pre-computed search results, a particular example is given next. This example originates from a particular application of the distributed database environment 1 in the travel industry, i.e., the database 4 keeps travel-related pre-computed search results and makes them available to end users. The following example, however, is not supposed to limit the issue of interrelated pre-computed search results such a travel data application. Rather, similar or analog conditions allowing a synergetic and therefore more efficient re-computation of interrelated pre-computed search results are present in database systems independent from the content of pre-computed data sets. In general, it can be said that any process of re-computing pre-computed search results will aim at a mutualization of re-computation sub-tasks that have to be executed commonly for any pre-computed search result of a set of pre-computed search results. Thus, re-computing pre-computed search results together that have such re-computation sub-tasks in common is generally favorable over re-computing pre-computed search requests together which do not share similar re-computation sub-tasks.

In a particular embodiment, the pre-computed search requests are round-trip flight data records, each specifying a travel origin and destination and a departure and arrival date (or, alternatively to the arrival date, a stay duration relating to the departure date). In this example, the database 4 contains pre-computed round-trip travel recommendations for any origin-destination pair and any departure-arrival-date pair to be covered. Table 1 indicates a small excerpt from the pre-computed travel recommendations kept in database 4, the excerpt being travel recommendations for the city pair Nice-Boston ("NCE-BOS") and for departure dates from 1st July to 5th July with maximum stay duration of five days, the abbreviation "pc-fr x" standing for "pre-computed travel recommendation number x".

TABLE 1

| NCE-BOS | Dep JUL 1. | Dep JUL 2. | Dep JUL 3. | Dep JUL 4. | Dep JUL 5. |
| --- | --- | --- | --- | --- | --- |
| Ret JUL 2. | pc-fr 0 | — | — | — | — |
| Ret JUL 3. | pc-fr 1 | pc-fr 5 | — | — | — |
| Ret JUL 4. | pc-fr 2 | pc-fr 6 | pc-fr 10 | — | — |
| Ret JUL 5. | pc-fr 3 | pc-fr 7 | pc-fr 11 | pc-fr 15 | — |
| Ret JUL 6. | pc-fr 4 | pc-fr 8 | pc-fr 12 | pc-fr 16 | pc-fr 20 |
| Ret JUL 7. | — | pc-fr 9 | pc-fr 13 | pc-fr 17 | +pc-fr 21 |
| Ret JUL 8. | — | — | pc-fr 14 | pc-fr 18 | pc-fr 22 |
| Ret JUL 9. | — | — | — | pc-fr 19 | pc-fr 23 |
| Ret JUL 10. | — | — | — | — | pc-fr 24 |

The re-computation of a particular pre-computed travel recommendation, for example pc-fr 9 relating to a departure date of 2nd July and a return date of 7th July, is roughly performed by the computation platform 3 by the following sub-tasks. The possible geographic routes between Nice and Boston including intermediate stops/change, for example: Nice-Paris-Boston, Nice-London-Boston, Nice-New York-Boston, Nice-Paris-New York-Boston, etc. are retrieved. All the possible flights, for example Air France 123 and Emirates 7123 on the leg Nice-Paris, Air France 456 and American Airlines 564 and United Airlines 125 on the leg Paris-New York, etc., on all the routes retrieved by activity 1 are found. This activity is performed for the outward part of the travel on the departure date 2nd Jul (sub-task 2a) and for the return part of the travel on the return date 7th July (sub-task 2b) because flights are generally not available on all days. The availability on all the flights determined by activities 2a and 2b, i.e., on 2nd Jul for the outbound part of the journey (=sub-task 3a) and on 7th Jul for the return part of the journey (=sub-task 3b), is checked. Fares are retrieved that can be applied to these flights on these dates. A typical fare is rule which yields a price for the whole journey. However, fares may also be valid for the outbound and for the inbound part of the journey on their respective dates in which case they can be retrieved once for the outbound part (=sub-task 4a) and once for the return part of the journey (=sub-task 4b). Fares have restrictions on the departure dates, on the return dates, on the flights to be applied on, and many others. Fares can be combined together, discounted in some specific cases and so on. The best solution, i.e., the connection with the best price, is kept, returned by the computation platform 3 and stored by the database 4 as pc-fr 9.

These sub-tasks are performed in a similar fashion for any pre-computed travel recommendation. When performing the re-computation for the whole set of pre-computed travel recommendations (pc-fr 0 to pc-fr 24), several re-computation sub-tasks can be mutualized. Executing sub-task 1 is necessary only once for the whole set of pre-computed travel recommendations pc-fr 0 to pc-fr 24 because all these pre-computed travel recommendations belong to the same origin-destination city pair Nice-Boston. Thus, sub-task 1 does not need to be re-done for every pre-computed search result pc-fr 0 to pc-fr 24.

The sub-tasks 2a, 3a and sub-task 4 are, on the other hand, specific to one departure date. They can therefore be re-used for all pre-computed travel recommendations relating to one and the same departure date. Table 2 indicates this for the pre-computed travel recommendations pc-fr 5 to pc-fr 9 relating to the departure date of 2nd July:

TABLE 2

| NCE-BOS | Dep Jul. 1. | Dep Jul. 2. | Dep Jul. 3. | Dep Jul. 4. | Dep Jul. 5. |
| --- | --- | --- | --- | --- | --- |
| Ret Jul. 2. | pc-fr 0 | — | — | — | — |
| Ret Jul. 3. | pc-fr 1 | Common | — | — | — |
| Ret Jul. 4. | pc-fr 2 | Sub-tasks: | pc-fr 10 | — | — |
| Ret Jul. 5. | pc-fr 3 | 2a, 3a, 4a | pc-fr 11 | pc-fr 15 | — |
| Ret Jul. 6. | pc-fr 4 | | pc-fr 12 | pc-fr 16 | pc-fr 20 |
| Ret Jul. 7. | — | | pc-fr 13 | pc-fr 17 | pc-fr 21 |
| Ret Jul. 8. | — | — | pc-fr 14 | pc-fr 18 | pc-fr 22 |
| Ret Jul. 9. | — | — | — | pc-fr 19 | pc-fr 23 |
| Ret Jul. 10. | — | — | — | — | pc-fr 24 |

Likewise, the sub-tasks 2b, 3b and 4b are specific to one return date and, thus, are commonly performed for pre-computed travel recommendations relating to one and the same return date. This is illustrated by table 3 for the pre-computed travel recommendations pc-fr 9, pc-fr 13, pc-fr 17 and pc-fr 21, all of which refer to the return date of $7^{th}$ July:

TABLE 3

| NCE-BOS | Dep Jul. 1. | Dep Jul. 2. | Dep Jul. 3. | Dep Jul. 4. | Dep Jul. 5. |
|---|---|---|---|---|---|
| Ret Jul. 2. | pc-fr 0 | — | — | — | — |
| Ret Jul. 3. | pc-fr 1 | pc-fr 5 | — | — | — |
| Ret Jul. 4. | pc-fr 2 | pc-fr 6 | pc-fr 10 | — | — |
| Ret Jul. 5. | pc-fr 3 | pc-fr 7 | pc-fr 11 | pc-fr 15 | — |
| Ret Jul. 6. | pc-fr 4 | pc-fr 8 | pc-fr 12 | pc-fr 16 | pc-fr 20 |
| Ret Jul. 7. | — | Common Sub-tasks: 2b, 3b, 4b | | | |
| Ret Jul. 8. | — | — | pc-fr 14 | pc-fr 18 | pc-fr 22 |
| Ret Jul. 9. | — | — | — | pc-fr 19 | pc-fr 23 |
| Ret Jul. 10. | — | — | — | — | pc-fr 24 |

Thus, in summary, only a part of sub-task 4, namely retrieving such fares which are not valid for the whole outbound part of the travel and for the whole return part of the travel, but are specific for sub-sets or particular travel recommendations, has to be performed separately for each pre-computed travel recommendation, while the other sub-tasks can be performed in common for all pre-computed travel recommendations relating to the same origin-destination city pair (true for sub-task 1) or at least for pre-computed travel recommendations relating to the same departure date (sub-tasks 2a, 3a and 4a) or to the same return date (sub-tasks 2b, 3b and 4b). Consequently, the more pre-computed travel recommendations relate to one origin-destination city pair and the more pre-computed travel recommendations relate to one departure date and return date, respectively, the more computation resources can be spared by mutualizing these sub-tasks across the respective pre-computed flight requests.

Figure 3:
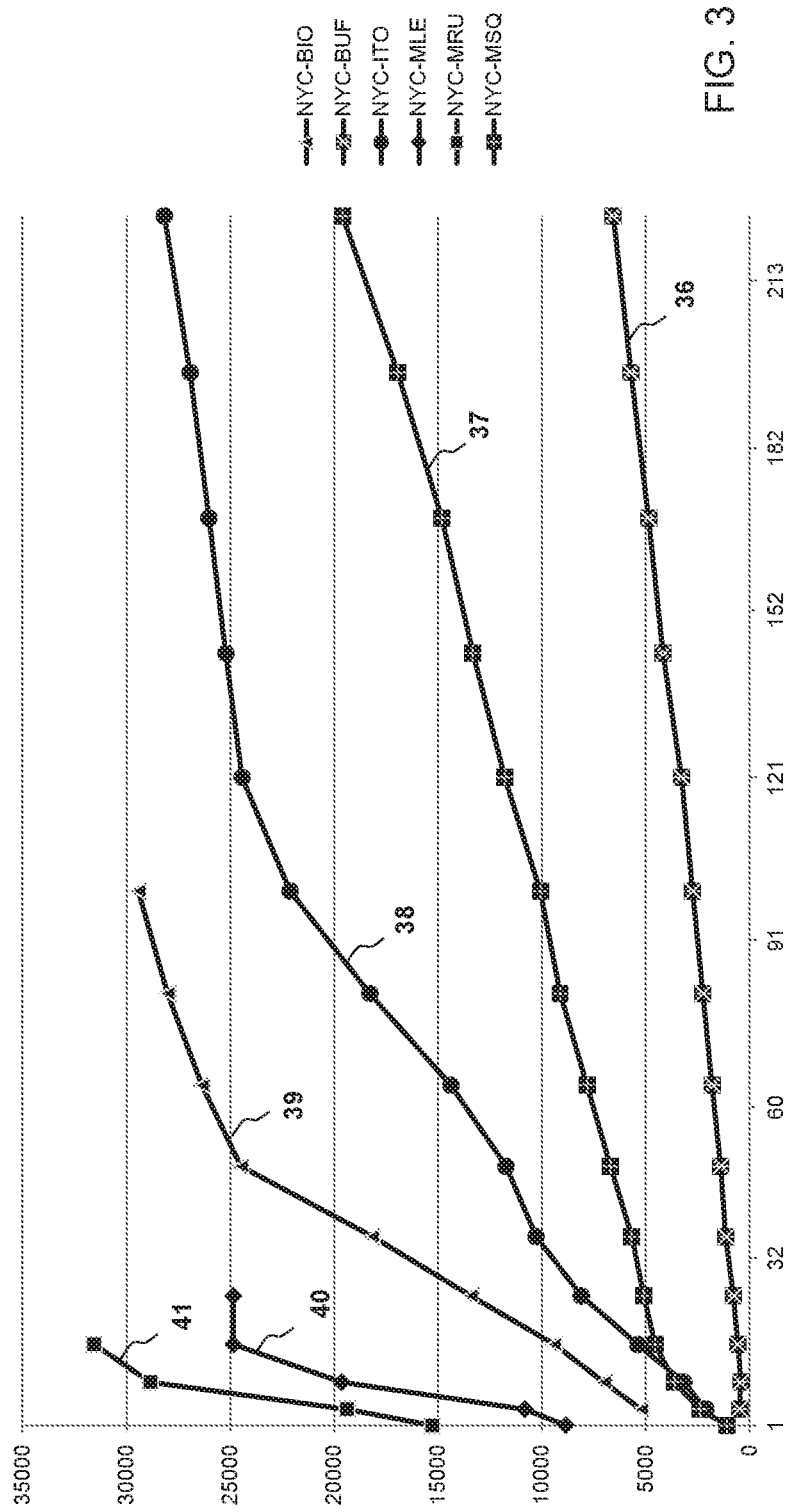
FIG. 3 illustrates varying computation resources which are necessary to re-compute different exemplary shares of pre-computed query results.

This relationship between increasing synergetic effects with an increasing number of pre-computed travel recommendations relating to an origin-destination city pair and to one departure or return date is also visualized by FIG. 3. FIG. 3 shows six graphs of exemplary pre-computed travel recommendation sets, each set belonging to one origin-destination city pair and forming an example of a share of pre-computed query results as used herein. In decreasing number of pre-computed travel recommendations being associated with a city pair, graph 36 relates to the city pair New York-Buffalo, graph 37 to New York-Minsk, graph 38 to New York-Hilo on Hawaii, graph 39 to New York-Bilbao, graph 40 to New York-Male and, finally, graph 41 to New York-Mauritius. The X axis of the diagram of FIG. 3 denotes the number of pre-computed travel recommendations, while the Y axis plots a measure of re-computation resources needed to perform a re-computation of pre-computed travel recommendations, namely CPU time.

On the one hand, FIG. 3 shows that re-computation of some pre-computed travel recommendation sets requires more computation resources than others. For example, re-computing pre-computed travel recommendations from set 41 including pre-computed travel recommendations for flights between New York and Mauritius is generally more costly than re-computing pre-computed travel recommendations from set 36 including pre-computed travel recommendations for flights between New York and Buffalo. This general difference of the amount of computation resources needed for re-computing pre-computed travel recommendations is taken into account by the including the re-computation costs C into the re-computation indicator as it has been explained in detail above. However, the graphs of FIG. 3 also indicate that the re-computation costs vary with the number of pre-computed travel recommendations of a set being re-computed. In general, the more pre-computed travel recommendations relating to one set are re-computed together, the less computation resources are needed to re-compute each pre-computed travel recommendation. For example, graph 36 indicates that re-computing 32 pre-computed travel recommendations of the set New York-Buffalo requires about 1000 ms of CPU, i.e., about 31.25 ms of CPU per pre-computed travel recommendation, while re-computing 170 pre-computed travel recommendations requires about 5000 ms of CPU, i.e., only about 29.4 ms of CPU per pre-computed travel recommendation. With respect to graph 38 relating to the city pair New York-Hilo, re-computing 35 pre-computed travel recommendations from that set requires about 10,000 ms of CPU, i.e., 286 ms of CPU per pre-computed travel recommendation, while re-computing 140 pre-computed travel recommendations from that set requires about 25,000 ms of CPU, i.e., only 178.5 ms of CPU per pre-computed travel recommendation. Hence, the pre-computed travel recommendations belonging to one origin-destination city pair (the present example of a share) are interrelated in terms of computing resources required for their re-computation as explained above.

In other words, the computation resources needed to re-compute a pre-computed search result i generally depend on whether or not other pre-computed search results related to the pre-computed search result i are re-computed during the same computation cycle. Thus, the computation resources to re-compute the pre-computed search results are not static, but vary with the selection of the set of pre-computed search results to be re-computed during the computation cycle.

Hence, a mechanism for dynamically determining an optimal number of pre-computed query results of a share to be re-computed during a computation cycle (briefly referred as "re-computation number" hereinafter) to optimize efficient utilization of re-computation resources is sought. At the same time, the mechanism should minimize wasting computation resources due to re-computing pre-computed query results which are still valid and do not need any re-computation. Furthermore, the mechanism should not compromise stability of the re-computation machine, but ensure its robustness.

Figure 4:
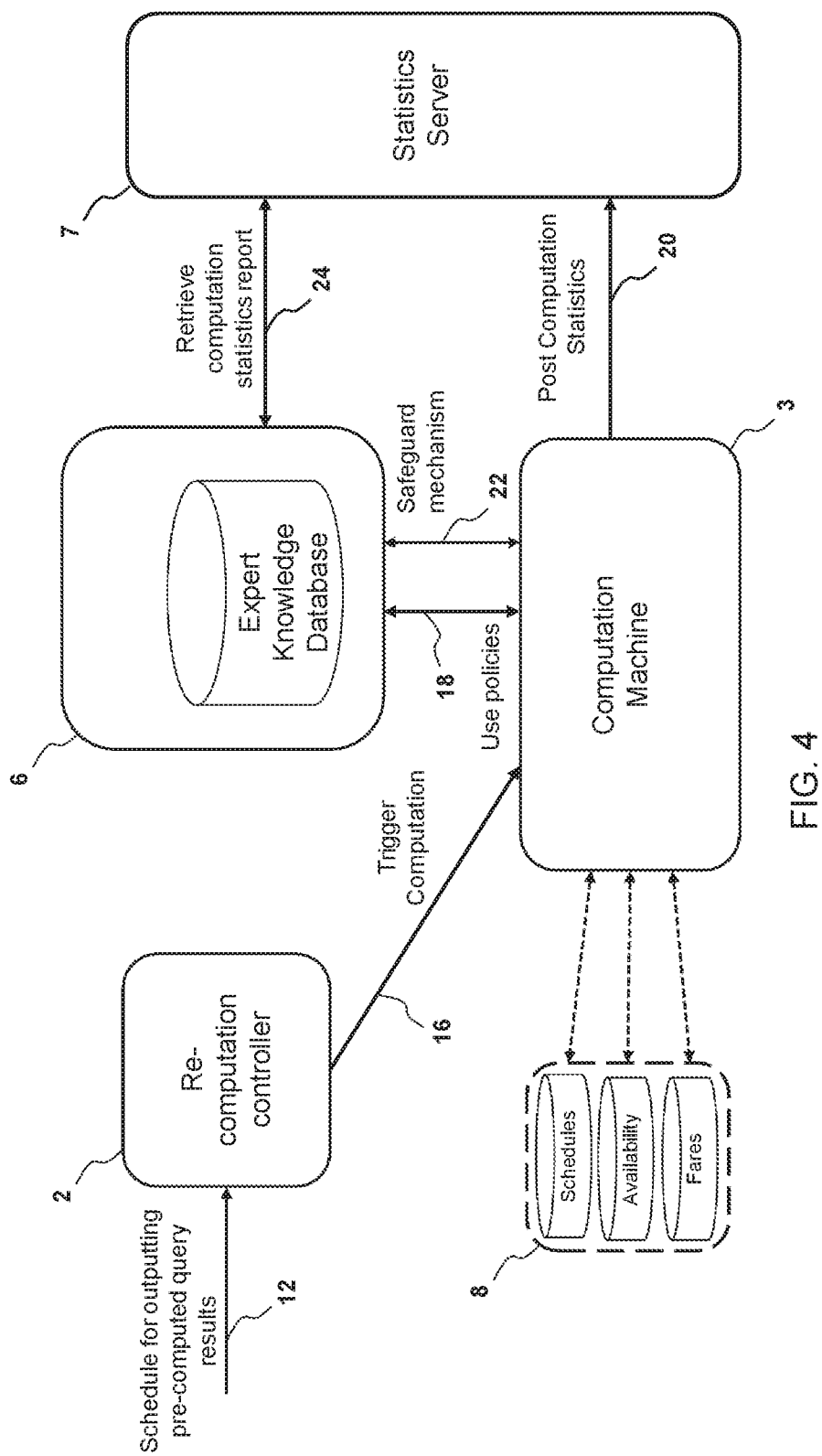
FIG. 4 is a more detailed schematic re-computation system as described herein.

The system 1 of FIG. 1 may be supplemented with an additional module hereinafter referred to as computation self-tuning sub-system 6 (FIG. 4). The function of the computation self-tuning sub-system 6 is to automatically and autonomously determine and fine-tune the number of interrelated pre-computed query results which are to be computed in order to re-compute more pre-computed search results with the same computation resources. To fulfil this function, the computation self-tuning sub-system 6 incorporates an expert knowledge database and is coupled to two further sub-systems. One sub-system is the computation machine 3 to which the computation self-tuning sub-system 6 provides an optimal (set of) number of pre-computed search results to be re-computed for a given re-computation request from the re-computation controller 2. In terms of functionality, the computation self-tuning sub-system 6 can be considered to form a part of the computation machine 3. The other sub-system is a statistics server 7 that acts as a statistics provider to refine the internal knowledge database of the computation self-tuning sub-system 6.

The re-computation controller 2 regularly triggers re-computation of pre-computed query results by sending 16 re-computation requests (possibly based on re-computation schedules 12) to the computation unit 3. For example, at some point of time, the re-computation controller 2 decides to re-compute one or more particular shares of pre-computed query results (also referred to as the "at least one first share")

and triggers a re-computation of this one or more shares. Each time the re-computation controller 2 requests 16 re-computation of certain pre-computed query results during a new computation cycle, the computation machine 3 retrieves relevant data from the self-tuning sub-system 6 to decide the policy to determine the number of pre-computed query results to be re-computed in the respective shares of pre-computed query results. A safe-guard mechanism process 22 provides a certain quality of the decision of the number of pre-computed query results to be re-computed which may lead to a potential dynamic realignment of the decision at the current instance and over time. An asynchronous process 24 collects from the statistics server sub-system 7 the statistics data from past re-computations (which have been posted 20 to the statistics server sub-system 7) to fine-tune the decisions over time. The re-computations of the computation machine 3 itself are based on further computation data, in the example of FIG. 4 flight or travel schedules, availability data and fares, stored in database system 8. Note that this is a non-limiting example of the distributed database system. The mechanism presented herein is applicable to all use-cases of pre-computing or caching query results where the pre-computation or caching involves synergies between inter-related query results in the manner exemplarily set out above in detail with respect to FIGS. 2 and 3.

There is no existing model that could be readily used to attribute an optimal re-computation number to a given share of pre-computed query results in order to re-compute the pre-computed query results of the share during a computation cycle. On the one hand, the synergistic effects of re-computing a number of related pre-computed query results depend on the specific use-case of the database system and the characteristics of the pre-computed query results in terms of their interrelation and decreasing validity over time. On the other hand, the optimal number of related pre-computed query results to be re-computed also depends on the re-computation strategy employed (e.g., always re-compute pre-computed query results with the least probability of being up-to-date). Furthermore, options may be included in computation triggers 16 from the re-computation controller 2 which have an—a priori unknown—influence which pre-computed query results may be more important to be valid/accurate than others.

In order to address these bars, it is therefore generally proposed herein to utilize a learning algorithm which dynamically optimizes the decision of the number pre-computed query results to be re-computed during a computation cycle over time, independent from the a priori unknown influences mentioned before. However, it does not seem possible to use a standard supervised learning algorithms, i.e., an algorithm that is solely based on the knowledge of an expert such as a Neural Network, since there is no knowledge of which re-computation number is optimal for a given share of pre-computed query results. Such algorithms would require to be trained on a database associating computation triggers 16 from the re-computation controller 2 with their best respective re-computation number for each share to be re-computed. However, the required expert knowledge is generally not available.

Another way to build this database would be to use a brute force approach to permute all possible re-computation numbers for a given computation trigger 16 from the re-computation controller 2. This could yield a determination which re-computation number is the most appropriate to the computation trigger 16. However, this approach has several drawbacks, as it would take a lot of time and hardware to gather all these statistics. Furthermore, this only establishes static re-computation numbers and there could therefore be discrepancies between current status of this database and the moment it is employed by the computation machine 3. This would expose the overall system 1 (FIG. 1) to a potential rise of technical rejects, i.e., failure states caused by computation triggers 16 from the re-computation controller 2, in case of changes of the pre-computed query results.

As a consequence, it is proposed to train the learning algorithm continuously in the course of processing each computation trigger 16 from the re-computation controller 2. An algorithm driven by trial and error appears to be suitable which rates the result of a decision of the re-computation number in response to receiving a computation trigger 16. The rating could, for example, utilize thresholds of a number of key performance indicators to judge the quality of the decision. Algorithms from the Reinforcement Learning family seem to be the most suited to this task.

Hence, the computation machine 3 is enhanced with the self-tuning module 6 implementing a Reinforcement Learning (RL) algorithm to determine an optimum number of pre-computed query results in a share to be re-computed during a computation cycle. More specifically, the computation machine 3 receives a request 16 to re-compute pre-computed query results of at least a first share. The computation machine 3, more specifically its self-tuning sub-system 6, determines a number of pre-computed query results in the first share to be re-computed in the current re-computation cycle based on a Reinforcement Learning algorithm. The determined number of pre-computed search results are limited by the computation machine's computation resources available during the given time interval. The computation machine 3 then re-computes the determined number of pre-computed query results in the first share during the computation cycle.

In some embodiments, the RL learning algorithm described herein considers key performance indicators (KPIs) and examines impacts of respective decisions of the number pre-computed query results to be re-computed during a computation cycle on the KPIs. Expert knowledge may be used to determine e.g., which options of computation triggers 16 from the re-computation controller 2 do not have an influence on the KPIs—this can be used to reduce the dimensionality of the learning space.

In some embodiments, the KPIs include one or more of the following factores: sum of numbers of pre-computed query results to be re-computed, elapsed time of re-computing the pre-computed query results to be re-computed in the given time interval, maximum computation resources to re-compute pre-computed query results indicated in the request, and maximum of memory required to re-compute pre-computed query results indicated in the request. In some embodiments, the values of the KPIs are aggregated to an aggregated value of KPIs as explained in more detail below. In some embodiments, the KPI may be hierarchically defined, with more general KPIs being composed of a number of more specific KPIs. This allows a fine-grained assessment of the technical effect, i.e., an efficient usage of computation resources due to an optimal number of pre-computed query results selected for re-computation. KPI aggregation is then at each hierarchy level, where the number of more specific KPIs are aggregated to form the more general KPI and the more general KPIs are aggregated to establish a common reward value for a certain action, as explained in more detail further below.

Figure 5:
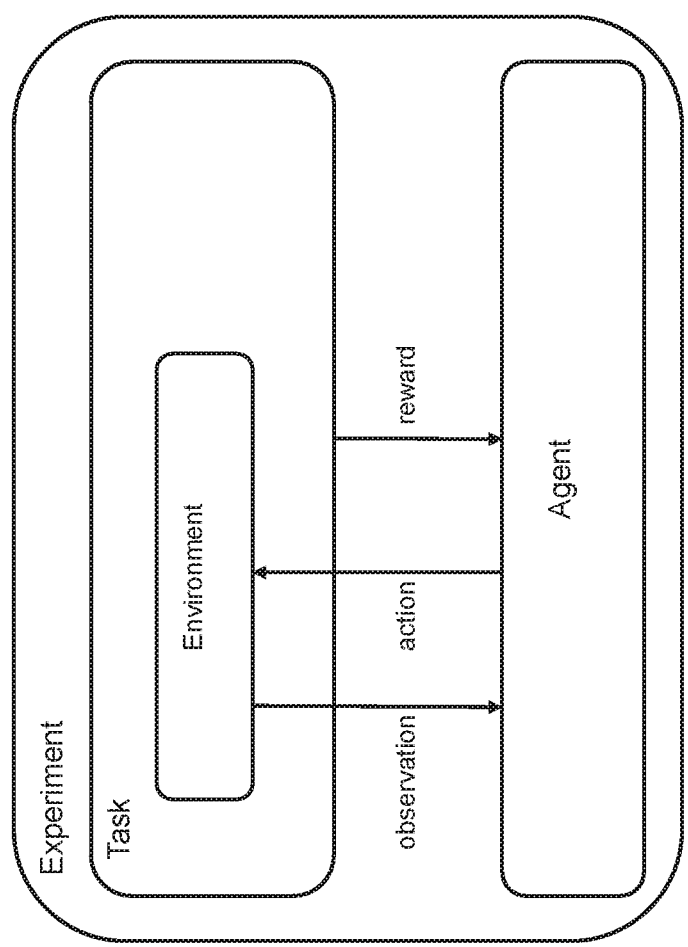
FIG. 5 shows the basic elements of a Reinforcement Learning system.

Before we turn to more detailed design options for a RL algorithm to solve the above-mentioned technical problem, we first give an overview of some concepts of Reinforcement Learning. Reinforcement Learning mechanisms are also described, for example, by the textbook "Reinforcement Learning" by Richard S. Sutton and Andrew G. Barto, published by the MIT Press in 1998. RL mechanisms utilize terms having an established meaning and are used herein in this established meaning to describe the algorithm for determining an optimal re-computation number, including (see FIG. 5). An agent is the module that learns and makes decisions, the computation machine 3 with the self-tuning sub-system 6 that defines the re-computation numbers. The environment is all facts outside the agent with which the agent interacts at each of a sequence of discrete points in time. The environment influences decisions by the agent and is influenced by the agent's decisions. A task is a complete specification of an environment, one instance of the reinforcement learning problem. An observation is a determination of a state of the environment at a discrete point in time. Herein, the state comprises various parameters such as content of the computation trigger request 16 (indication of one or more shares to be re-computed and possibly further re-computation options), re-computation status (has the computation successfully ended?), KPIs of the re-computation (how well did the computation end?, more specifically: CPU costs, memory consumption, etc.). An action is a decision taken by the agent from a set of actions available in the current state of the environment. Herein, an action is a determination of the number of pre-computed query results of one of more shares to be re-computed during the current computation cycle. A policy is a mapping from the states of the environment to probabilities of selecting each possible action. A reward function is a function determining a reward to each action selected by the agent. Herein, the reward function uses KPI thresholds. For example, an action that causes a technical reject from the environment will yield a bad reward. In some embodiments, the reward function attributes a value to an action taken by the self-tuning sub-system 6 based on the aggregated KPIs retrieved from the statistics server 7. A value function is a table that associate a set of actions with their estimated reward.

The goal of the agent is to maximize the rewards not immediate, but in the long run. A general feature of Reinforcement Learning is the trade-off between exploration and exploitation. In exploration mode, the agent tries out new kinds of actions to see how effective they are. The effectiveness of an action is immediately given by the reward returned to the agent in response to the selected action. In exploitation mode, the agent makes use of actions that are known to yield a high reward using of the history of rewards derived from the value function. More specifically, during each exploitation phase, the re-computation number is determined that is, according to expert knowledge database, currently known to yield the most rewards. The aim is to maximize the rewards on the long run (mathematically, this means that the sum of all rewards on an infinite lifespan is maximized). Generally, in exploitation mode, the algorithm tries to make profit of what it has learned, whereas the exploration mode can be considered as an "investment" to look for other opportunities to further optimize the determination of the re-computation number.

The agent continuously learns in exploration and in exploitation mode from its environment. However, exploration and exploitation should be balanced. Too strong a focus on either exploration or exploitation will yield poor results. The agent may explore to discover new strategies that could potentially yield a very high reward, but exploring too much may be dangerous because the agent never uses its knowledge of the environment. A strategy to balance these two modes to solve the particular technical problem discussed herein will be presented further below.

Some particularities of the reward function design to implement the computation machine 3 with the self-tuning sub-system 6 are described next. The main issue that should be avoided are technical rejects, i.e., failure states of the computation machine 3 caused by an inappropriate re-computation number which results in a rejection message to a computation trigger 16. Hence, a high penalty is attributed to the agent in such a case.

On the other hand, the agent should not over-react. It is possible to have instabilities of the computation machine 3 which could generate technical rejects and which are not due to the actions taken by the agent. To this end, in some embodiments, the re-computation numbers which ended in technical rejects (RcNbTR) are related to the re-computation numbers that did not end in a technical reject (RcNbOK). Hence, in some embodiments, the first term of the reward function is defined with the following formula:

$$PENALTY_{TR}\left(\frac{RcNbTR}{RcNbOK}\right)$$

with $PENALTY_{TR}(X)=\exp(X)$, i.e. an exponential function.

Furthermore, a set of KPI thresholds is utilized in some embodiments. These KPI thresholds are limits that should not be exceeded by the actions of the agent. Therefore, these KPI thresholds should be wisely determined e.g., with the help of domain experts of the system 1 (FIG. 1), depending on the particular use-case of the system 1.

In order to increase safe actions by the agent, an additional level of safety is taken in some embodiments. The threshold is taken as a given percentage of the actual threshold from which a technical reject would actually be generated ("hard threshold"). This yields three possible states: acceptable (below the threshold), warning (above the threshold, but still below the hard threshold), and technical reject (above the hard threshold). In this way, a safety margin in introduced below the hard threshold:

$$THRESHOLD_{KPI_x} = MARGIN_{THRESHOLD(KPI_x)} * HARD\ THRESHOLD_{KPI_x}\ \text{with}\ 0 < MARGIN_{THRESHOLD(KPI_x)} \le 1\ \text{constant}$$

In response to determining that all KPIs are below their corresponding threshold after the agent has taken a certain agent, the reward value is positive. The closer a KPI is located to its threshold, the higher the attributed reward is. But if a KPI exceeds its threshold ("warning" state), the system is rewarded with a negative reward. A negative reward is also referred to as a penalty.

Optionally, the KPIs are normalized by their threshold to enable faster comparisons. So, in some embodiment, a second term of the reward function is given by:

$$\sum_X REWARD\left(\frac{KPI_x}{THRESHOLD_{KPI_x}}\right)$$

where, for each KPI, the reward is positive (multiplied by a positive factor "positive reward" PR) if the threshold is kept, but negative (multiplied by a negative factor "negative reward" NR) if the threshold is exceeded:

$$REWARD(X) = \begin{cases} X*PR, & X \le 1, PR > 0\ \text{constant} \\ X*NR, & X > 1, NR < 0\ \text{constant} \end{cases} \text{with}\ |NR| > \Sigma_{KPI} PR$$

The parameters $MARGIN_{THRESHOLD(KPI_X)}$, PR and NR variables are to be tuned with based on an empirical approach to obtain the wished behavior.

In summary, in some embodiments, the global reward function is defined as:

$$REWARD_{(KPI)} = PENALTY_{TR}\left(\frac{RcNbTR}{RcNbOK}\right) + \left(\sum_{X} REWARD\left(\frac{KPI_x}{THRESHOLD_{KPI_x}}\right)\right)$$

Figure 6A:
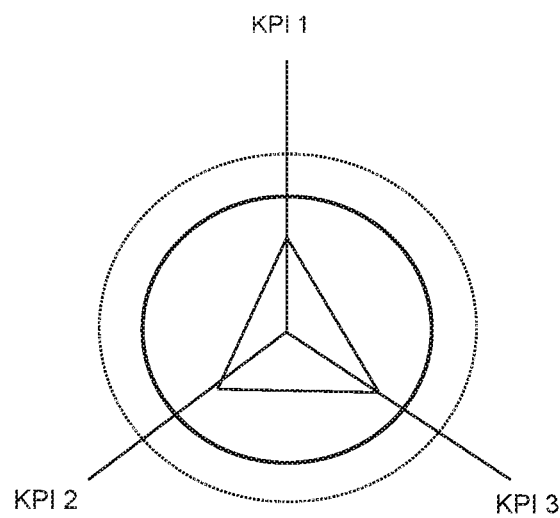
FIGS. 6A and 6B illustrate two examples of an aggregated key performance indicator calculation.
Figure 6B:
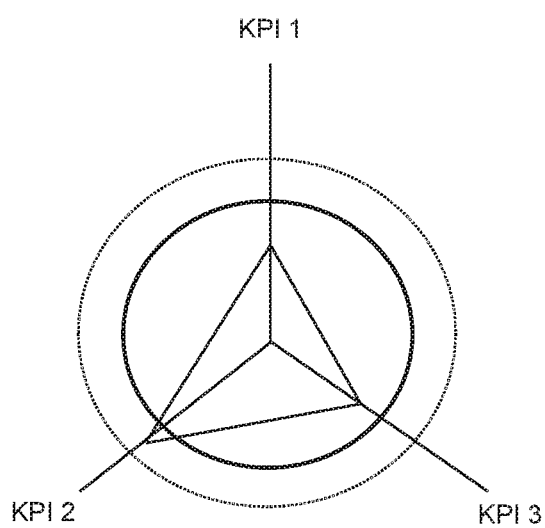

An example is given by FIG. 6. Two radars are plotted with a vector of three KPIs that are determined after a re-computation of a number of pre-computed query results according to the decision by the agent implemented in the self-tuning sub-system 6. As explained above, the KPIs are normalized by their respective allowed threshold indicated by the solid inner circle, with the hard threshold indicated by the dashed outer circle. When each KPI is below the threshold as illustrated by FIG. 6A, the resulting vector of the three KPIs (triangle completed inside the solid inner circle) is considered to be acceptable. However, if a single KPI exceeds the treshold and the resulting vector enters the corridor between the solid and the dashed circle as illustrated in FIG. 6B, the RL algorithm considers this as a warning and penalizes the indivual reward for this KPI (KPI 2 in the example of FIG. 6B).

Some particularities of the value function design to implement the computation machine 3 with the self-tuning subsystem 6 are described next. As mentioned above, the value function is a table that associates a set of N possible actions, namely the number of pre-computed query results of a share to be re-computed during the computation cycle, $W_i$, with their estimated rewards. In some embodiments, estimated rewards associated by the value function are specified by a reward function of the Reinforcement Learning algorithm, such as the reward function example described above. As described above, the reward function may attribute an aggregated value of a plurality of key performance indicators to a corresponding selection of pre-computed query results of the least one first share.

In some embodiments, the value function is computed iteratively from a history of previously received rewards (indexed with k, which represents the kth iteration). The value function V of re-computation number $W_i$ is therefore in some embodiments:

$$V_{k+1}(W_i) = V_k(W_i) + \alpha_{(k+1)}(W_i) * (REWARD_{(k+1)}(W_i) - V_k(W_i))$$

where $\alpha_k(W_i)$ is the learning speed parameter (or step-size parameter) used to process the reward after the $k^{th}$ selection of the re-computation number $W_i$.

In this regard, two Reinforcement Learning formulas are used to insure a convergence of the RL algorithm. The first formula provides that the learning steps are large enough to eventually overcome any initial conditions or random fluctuations:

$$\sum_{k}^{\infty} \alpha_k(W) = \infty$$

The second one is given by:

$$\sum_{k}^{\infty} \alpha_k^2(W) < \infty$$

Since the system 1 is non-stationary, i.e., the system's behavior will vary with time such that the optimal re-computation numbers will change, this second condition cannot be respected. Indeed, the system never completely converges because it needs to continually adapt to change that may occur.

In some embodiments, the learning speed parameter $\alpha_k(W_i)$ is given a higher influence to the latest rewards and is adapted to the system's situation to provide further learning optimization, including the state of the environment and the mode of the RL algorithm. The current mode is either exploration or exploitation. As the decisions should be conservative in order to avoid failures, the learning should be performed less actively in exploration mode, i.e., the agent learns, but safely. Conversely, in exploitation mode, a modification of behavior has to be taken into account more quickly. The code load indicator indicates a recent software update for the computation machine 3. If the code load indicator is set to true, then the system has to learn more quickly as a code load can induce quick and real KPIs variation which do not indicate any system instability The step-size parameter is then a function of a system's situation S (k) and a α constant:

$$\alpha_k(W) = \alpha * S(k)$$

$$\text{where } S(k) = \begin{cases} 1, & \text{Exploitation Mode} \\ 0 < ER < 1, & \text{Exploitation Mode} \quad ER, CL \text{ constant} \\ CL > 1, & \text{Code Load} \end{cases}$$

The variables α, ER, and CL are tuned with an empirical approach (e.g., by using knowledge of a domain expert) to obtain the wished behavior.

The learning speed parameters should ensure that, in the case of one negative reward integration, the value function is not too much degraded, as it can be due to some system instability:

$$V_{k+1}(W_i) < V_k(W_i)$$

After SN successive negative rewards, the RL algorithm should force the system to quickly react and re-determines a new policy from where to start:

$$V_{k+SN}(W_i) < 0$$

At this stage, the certainty of the value function is questionable. It is likely that the value function for other re-computation numbers is incorrect. So the first approach, could be to use a "brute approach" to arbitrarily set the new restart learning point to:

re-computation number$_{New}$=DF·re-computation number$_{Old}$ where 0<DF<1 is a degradation factor.

Figure 7:
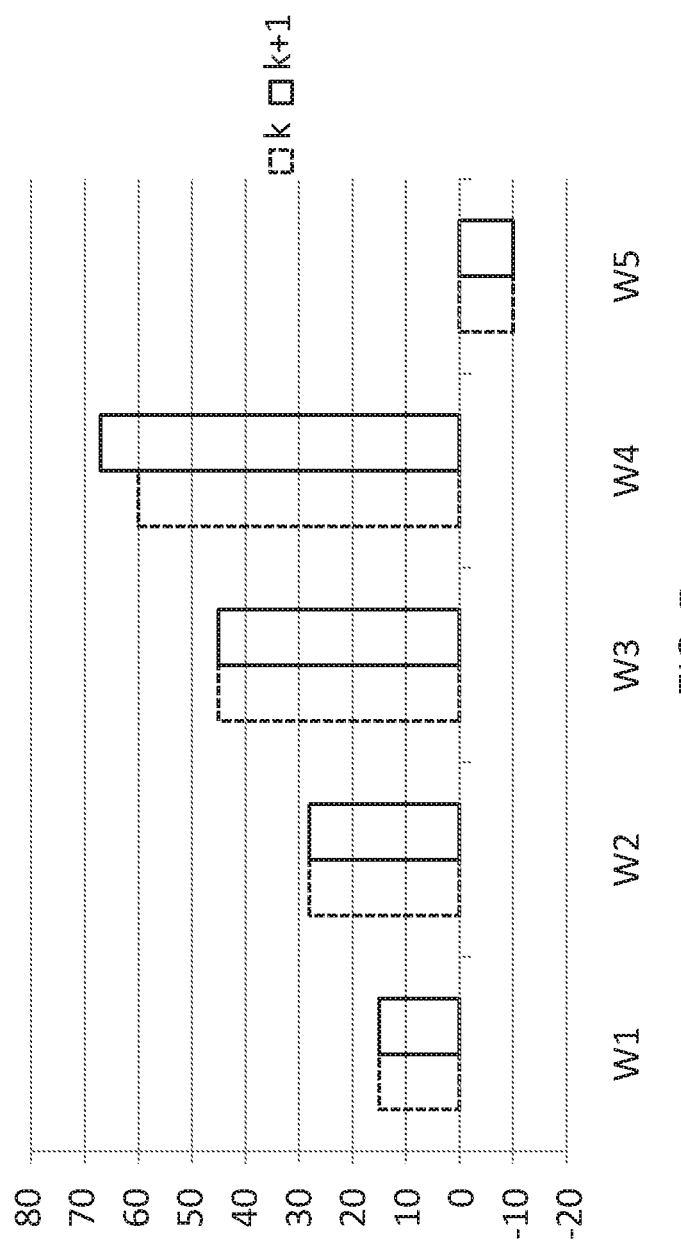
FIG. 7 shows an example of a value function update.

FIG. 7 shows an example of reward integration by the value function of the weight W4. The value of the reward for W4 has increased between k+1 and k selections.

In some embodiments, the request to re-compute pre-computed query results of at least a first share (=computation trigger 16 in the example of FIG. 4) indicates pre-computed query results of the at least first share which are to be re-computed. Re-using the non-limiting example of FIG. 3 described above, the request may include one or more origin and a destination pairs, each origin and destination pair indicating a share to be re-computed (as in the example of FIG. 3, each origin and destination pair defines a share). Furthermore, the request may indicate a departure date, multiple departure dates or a range of departure dates, as well as a stay duration, multiple stay durations or a range of stay durations. To give a particular example, the re-computation controller 2 may request the computation machine 3 to re-compute the lowest prices of all travel recommendations with origin Nice and destination Boston (identifying the Nice-Boston share) with a departure date range of 30 days starting on 1 Nov. 2017 and a stay duration range between 7 and 14 days (=an 8 day stay duration range), in total requesting the re-computation of 30·8=240 pre-computed query results forming a portion of the Nice-Boston share to be re-computed.

In these embodiments, the computation machine 3 is optionally arranged to determine the number of pre-computed query results in the first share to be re-computed based on the indicated pre-computed query results of the at least first share. For example, the computation resources of the computation machine 3 may allow to re-compute 100 pre-computed query results in the next three computation cycles. In this situation, the computation platform is arranged to select an optimal number of pre-computed query results to be re-computed during the next computation cycle by splitting the portion of the first share defined by the number indicated in the request 16 into three slices, where the split results in slices which utilize the available computation resources in an optimal manner. Each of the three slices is re-computed during the next three (or three of the next) computation cycles. A further, more specific example of such split is given below.

More particularities of the Reinforcement Learning algorithm design to implement the computation machine 3 with the self-tuning sub-system 6 are described next with reference to FIG. 8. In some embodiments, the re-computation number determination algorithm is composed of three main activities. In response to receiving a computation trigger 16 by the computation machine 3 (FIG. 8: "Start activity 1"), the agent located at the self-tuning sub-system 6 (after having been notified via interface 18) retrieves 24 from the statistics server 7 the re-computation number of each of the shares of pre-computed query results concerned which were determined at the last re-computation of the respective share. The agent then determines the RL mode (FIG. 8: "use & record"), i.e., chooses between exploration mode and exploitation mode. The mode determination is based on the value function for the retrieved last re-computation number(s) as will be described in more detail below. The agent also records 20 computation reports into the statistics server 7 (FIG. 8: "use & record"). Hence, in some embodiment, the computation machine 3 is arranged to store the determined number of pre-computed query results in the first share in the statistics server 7 for a subsequent determination of the number of pre-computed query results to be re-computed in a subsequent computation cycle.

Figure 8:
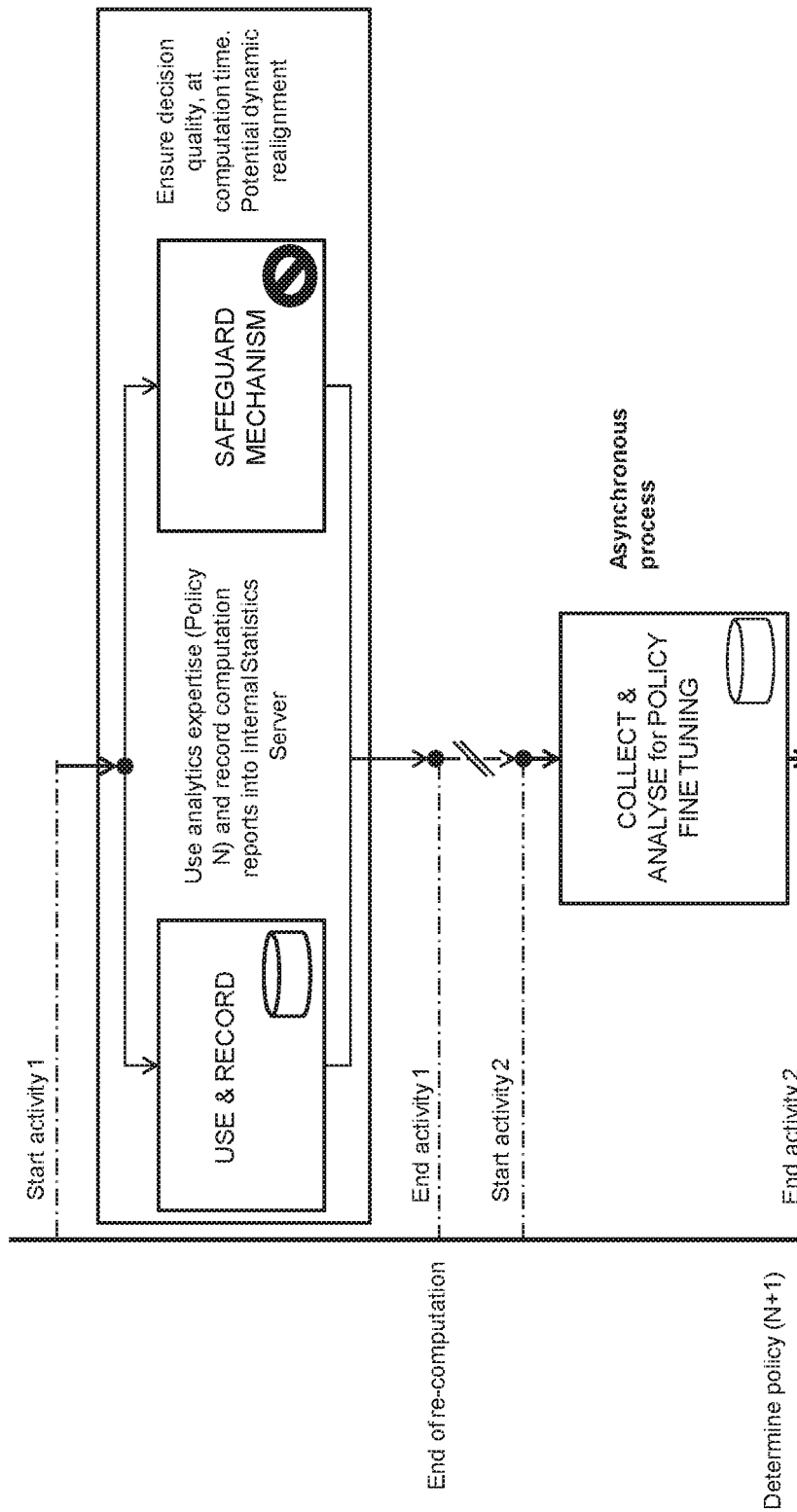
FIG. 8 is a schematic flow chart with high-level processes executed by the computation machine and its sub-systems described herein.

In parallel to these activities (FIG. 8: "use & record"), the agent may employ a safeguard mechanism (FIG. 8: "safeguard mechanism") in order to exclude situations in which the determinations of the agents could cause a failure state of the computation machine 3 or the overall system 1 that endangers the overall computations). For example, if such a technical issue with the self-tuning sub-system 6 is detected, the safeguard mechanism may blacklist the self-tuning sub-system 6 for one or more particular shares to be re-computed, and use a default policy (such as re-compute a given or pre-determined number of pre-computed query results of the one or more shares) which is known to work correctly. The agent further executes an asynchronous process (FIG. 8: "Start activity 2") to collect history data from the statistics server 7, analyze these data and fine-tunes the data basis for the decisions of the re-computation numbers.

More details of the RL mode determination are described next. As explained in the introduction on Reinforcement Learning above, a balanced tradeoff is sought between these two modes.

Two known balancing methods are the Epsilon-Greedy strategy and the Softmax strategy. The Epsilon-Greedy strategy explores new strategies a given percentage of the time, and exploits the action with the highest reward the rest of the time (greedy action). For example, the system could explore 1% of the time (by choosing at random an action among the set of possible actions) and exploit the rest (99%) of the time (use the best rated action). The Softmax strategy addresses one drawback of the Epsilon, namely exploring by equally choosing among all actions. This means that it is as likely to choose the worst-appearing action as it is to choose the next-to-best action. In tasks where the worst actions are bad, this may be disadvantageous. The Softmax strategy therefore refines the Epsilon-Greedy strategy by varying the action probabilities as a graded function of estimated value.

The balancing strategy used in some embodiments herein is different from these two known strategies. At a general level, the computation machine 3 is arranged to retrieve an indication of pre-computed query results of the at least one first share which have been re-computed in a previous time interval, i.e., the last re-computation number as explained above. The computation machine 3 is further determined to apply an exploitation mode of the Reinforcement Learning algorithm or to apply an exploration mode of the Reinforcement Learning algorithm. In some embodiments, the computation machine 3 determines to apply either the exploitation mode of the Reinforcement Learning algorithm or to apply the exploration mode of the Reinforcement Learning algorithm determining the reward given by the value function for the pre-computed query results indicated by the retrieved indication and by determining a number of re-computation cycles to apply the exploitation mode of the Reinforcement Learning algorithm based on a comparison of the determined reward with a reward threshold. In some embodiments, the reward threshold is defined by given percentages of threshold values of respective ones of the plurality of key performance indicators for which re-computation during the given time interval would result in an error state of the computation machine. As described below, this introduces an additional safety net avoiding technical failure states of the computation machine 3 caused by the RL algorithm. The computation machine 3 applies the exploitation mode of the Reinforcement Learning algorithm during the current re-computation cycle and subsequent re-computation cycles as given by the determined number of re-computation cycles. A more detailed example will be described below.

In response to determining to apply the exploitation mode, the computation machine 3 of some embodiments is arranged to determine the number of pre-computed query results in the first share to be re-computed in the current computation cycle based on a value function of the Reinforcement Learning algorithm for the number of pre-computed query results indicated by the retrieved indication, the value function associating possible selections of pre-computed query results in the at least first share for re-computation with respective estimated rewards.

In some embodiments, the computation machine iteratively adapts the number of pre-computed query results indicated by the retrieved indication at least based on the number of pre-computed query results indicated by the retrieved indication, the value function of the Reinforcement Learning algorithm for the number of pre-computed query results indicated by the retrieved indication and the reward threshold. A more specific example how the computation machine 3 may determine a new re-computation number during the exploration mode in order to further optimize its actions is given below.

The balancing mechanism to switch between exploitation mode and exploration mode is supported by the fact that it is possible to "rank" the re-computation numbers. In other words, it uses the fact that up to a certain point, the greater the re-computation number, the greater the reward (and after some point, there is a failure). This helps to build an exploration policy: given a re-computation number that is acceptable (the KPIs are under the threshold), it can be decided to explore with a greater re-computation number (since it is known that a lower weight will not give any improvement of the reward).

It is also possible to decide how much the system can explore by using the difference between the value function of the current re-computation number and the maximum expected reward. To this end, it can be estimate how far the re-computation number is from the KPI threshold and use this estimation to decide to explore with a big or small step. This enables to reach a trade-off between the speed of convergence to the optimal re-computation number to apply to a given share and the risk of collecting low reward (in particular avoidance of technical rejects).

More specifically, the following case-based RL mode determination algorithm is used in some embodiments to find to the optimal re-computation number, while keeping the system 1 stable. If the value function for the last re-computation number is between 0 and 50% of the maximum aggregated reward resulting from all KPIs peeking at the their respective KPI threshold values (Max Reward), exploit C1 times and then explore a given number of times (e.g., one time) with a greater re-computation number (details of choosing this greater re-computation number will be detailed below). If the value function for the last re-computation number is between 50% and 75% of Max Reward, exploit C2>C1 Times and then explore one time with a greater re-computation number. If the value function for the last re-computation number is between 75% and 90% of Max Reward, exploit C3>C2 Times and then explore one time with a greater re-computation number. If the value function for the last re-computation number is between 90% and 100% of Max Reward, exploit C4>C3 of the time and then explore one time with a greater re-computation number. The C1, C2, C3 and C4 variables are to be tuned with an empirical approach to obtain the wished behavior (in terms of speed of convergence, for example).

In response to determining that the agent is allowed to explore in the current computation cycle, the greater re-computation number for the exploration is to be decided. It is assumed that the calculated reward for a given re-computation number is better when the KPIs after the decision for the given re-computation number is closer to the KPIs threshold than for the last re-computation number, and that the reward evolution is not proportional to the re-computation number (sub-additivity), e.g.:

$$REWARD(2*W) \leq 2*REWARD(W)$$

As, in some embodiments, the system has a conservative approach to avoid failure states, the convergence towards the best re-computation for a given share is done carefully in some embodiments, step by step. In some embodiments, the new re-computation number $W_{new}$ is given by:

$$W_{new} = \frac{REWARD_{MAX}}{V_k(W_i)} W_i$$

where $V_k(W_i)$ is the value function of the last exploited re-computation number $W_k$. This is a strictly positive value since the current RL mode is exploration mode that has been allowed by the comparison with the maximum reward. This approach is iteratively applied to determine the re-computation number for the next exploration phase. Over a multiple number of exploration phases, the respective employment of this formula in each of the exploration phases to determine $W_{new}$ forms an iterative approach bring the re-computation number closer and closer to the maximum aggregated reward $REWARD_{MAX}$ and, thus, to select the re-computation number in an optimized manner to efficiently use the available re-computation resources.

An example of this balancing selection between exploitation and exploration mode is given by FIG. 9. This example details the evolution of the value function of a given share of pre-computed query results.

Initially (FIG. 9A), when a share is to be re-computed for the first time, no previous re-computation number for the share exists. In this case, the exploration mode is selected by default. In some embodiments, the self-tuning sub-system 6 may issue a warning 14 to re-computation controller 2. The re-computation controller 2 may then include a default re-computation number in future requests 16 relating to this share. The agent selects a given conservative (i.e., relatively low) re-computation number for the share, as visualized by FIG. 9A. A reward value for this action is calculated based on the Reward Function explained in detail above. The computation machine 3 then re-computes pre-computed query results of the share in the computation cycle in accordance with the determined re-computation number. The determined re-computation number is stored in the statistics server 7.

In response to the computation machine 3 receiving another computation trigger 16 to re-computation pre-computed query results of the share in a next re-computation cycle (still FIG. 9A), the last re-computation number is retrieved from the statistics server 7. The agent then determines that the last re-computation number was below the maximum reward, for example in the range of 50-75% of the maximum reward according to above case 2. According to the balancing algorithm above, the agent determines the RL exploitation mode for C2 intervals, in the example of FIG. 9B for three more computation cycles. This ensures that the previous re-computation number is stable solution (but not a necessarily optimal choice, yet). In that case, C2 similar re-computations of the share with the same pre-computed query results of share will be performed before proceeding to a new exploration.

At the C2+1$^{st}$ re-computation of the share (FIG. 9B), a new exploration with a greater re-computation number determined as previously explained. This yields a greater re-computation number with a higher reward value. During following re-computations, RL exploitation mode is again selected (still FIG. 9B). This time, the reward value for the greater re-computation number is in case 3, so the next C3 re-computations of the share are done in exploitation mode. Like in FIG. 9A, this ensures that the explored re-computation number is stable.

Figure 9A:
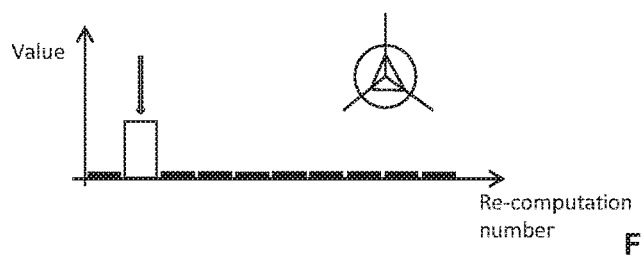
FIGS. 9A-9E illustrate an iterative and Reinforcement Learning-based approach to determine an optimal number of pre-computed query results to be re-computed during a computation cycle.
Figure 9B:
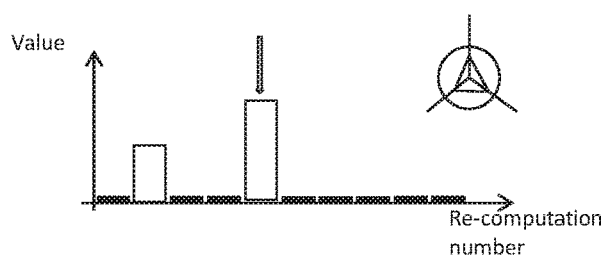
Figure 9C:
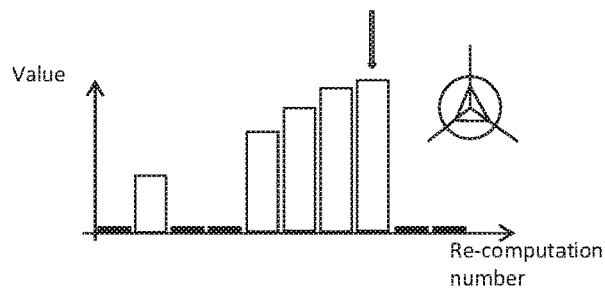

This alternating selection of one exploration followed by a number of exploitations is subsequently iterated in the same manner to determine the optimal re-computation number for this particular share (FIG. 9C). The mode selection algorithm will enter case 4, where the number of subsequent exploitations C4 is the highest. Hence, new, potentially more optimal re-computation numbers are now explored less often than in previous iterations.

Figure 9D:
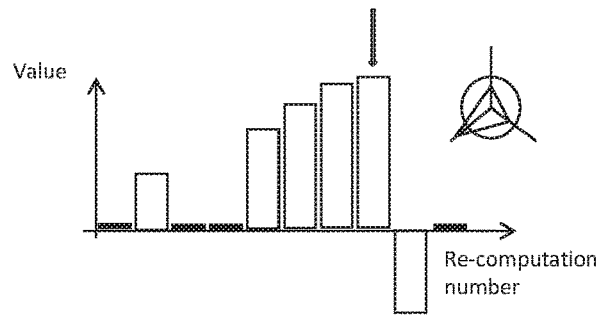

At some point of time, a newly explored re-computation number might enter the warning zone, i.e., the KPI threshold for one or more KPIs is exceeded, yielding a negative reward value (FIG. 9D). As explained before, in some embodiments, this is a warning as the threshold has been calculated a given percentage below the hard threshold. This means that the re-computation number reached (in fact, even exceeded) the phase in which not much improvement of the reward is to be expected. Hence, the re-computation number is stabilized to the latest value that yielded the best rewards. However, this stabilization only means that exploration is done less often, but not never. Indeed, it is desirable to continue exploration from time to time, as overall system is non-stationary and might change over time, e.g., as the pre-computed query results maintained by the search platform 4 change. Further exploration phase enable the system 1 to discover and catch up with those changes and developments.

Figure 9E:
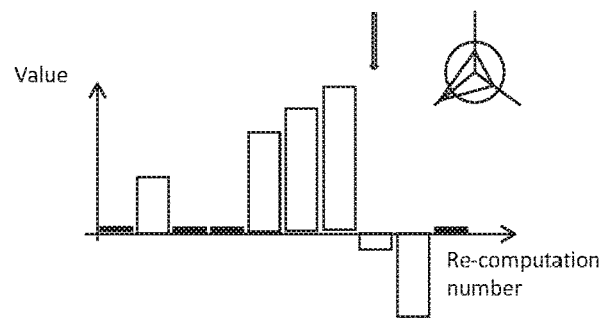

FIG. 9E refers to a special situation which might indicate a degradation of the system 1 in which a reset could be suitable. Possibly reasons for a degraded performances are a substantial change of the pre-computed query results, a change of the database scheme or model of the search platform 4, or a change of the re-computation rules, or, more general, an update of the search platform 4, of the computation machine 3 and/or of the re-computation controller resulting in a changed/refined functionality or changed pool of pre-computed query results. The term degradation indicates that the optimum re-computation number might be reduced to these changes compared with the state of the system 1 before the changes.

In the scenario of FIG. 9E, multiple subsequently returned rewards for subsequently explored re-computation numbers are negative although the system 1 was stable during a certain previous amount of time. After several rewards integration, the value function for the weight is still negative. The drop of the rewards to the negative values then implies that there is no other apparent reason than a possible degradation. Hence, this indicates that value function is probably incorrect or at least not suitable anymore to address the changes in the system. A new re-computation numbers is then determined by analyzing the value function for the current re-computation number to determine the new start point. For example, the self-tuning sub-system 6 may start from the given default initial value of the re-computation number as described above for the case that a share is re-computed for the first time. In another example, the self-tuning sub-system 6 may perform a "dichotomic approach", i.e., use the latest re-computation number which yielded a positive reward, and to reduce this further e.g., by dividing it e.g., by two.

Some details of the re-computation number readjustment are described next.

In some embodiments, the computation machine 3 does not have enough computation resources to re-compute a complete share or a part of the share which is requested to be re-computed by the re-computation controller 2 in a single re-computation cycle. In this embodiments, the mechanisms described herein can be employed to split the share or requested part of the share into optimal slices which are re-computed by the computation machine 3 over a plurality of computation cycles. Here, the re-computation number determined by the mechanisms described herein indicates the size of a slice to be re-computed in each cycle.

Furthermore, in some embodiments, the pre-computed query results are arranged in cells with two dimensions. One non-limiting example has already been mentioned above with reference to FIG. 3 where priced travel recommendations are pre-computed and stored in a respective share for each origin and destination pair. In this non-limiting example, the two dimensions are departure data and stay duration. In such embodiments, a re-computation number indicates a square-shaped part of the share, i.e., indicates a tuple of two numbers, one for each dimension. The determination of the re-computation number according to the mechanisms described above would respect:

$$d = \text{ceil}(\sqrt{W}) \quad s = \text{floor}\left(\frac{W}{d}\right)$$

wherein d is the departure day range (departure on the next d days, the first dimension) and s is the stay duration range (stay duration from 1 to s days, the second dimension) and W is an optimum weight recommended by the expert knowledge database (i.e., in current state of the RL algorithm, it is thought to yield the highest reward). However, depending on the departure date range and stay duration range requested in the computation trigger 16, this solution can lead to some small re-computation number slices at the end of the (part of the) share to be re-computed.

The following algorithm provides an improved split of the part of the share to be re-computed by the computation machine 3 into slices, each of the slice is to be re-computed over a plurality of computation cycles, namely to choose a parallelogram-shaped re-computation number as follows. A stay duration range s is determined that is close from √W and which splits the stay duration range indicated in the request 16 from the re-computation controller 2 well into pieces as equal as possible. The highest possible re-computation number is determined being a square of s·d with the less non-full slice (i.e., the last slice of the part of the share to be re-computed is closest to the re-computation number, i.e., the size of the other slices), and with s>d in order to optimize the efficient usage of computation resources (if s>d, less departure dates have to be re-computed during each computation cycle, e.g., re-computing a square of 3d·15s is less costly than re-computing a square of 15d·3s).

The determined numbers s and d are set to $$\text{floor}\left(\frac{SR}{\sqrt{W}}\right),$$

and thus have:

$$s = \text{ceil}\left(\frac{SR}{\text{floor}\left(\frac{SR}{\sqrt{W}}\right)}\right) \text{ and } d = \text{floor}\left(\frac{W}{s}\right).$$

Implicitly, this algorithm considers that the stay duration range indicated in the request 16 is smaller than the departure date range indicated in the request and that indicated stay duration range is therefore the one that should be well split. If, on the other hand, the stay duration indicated in the request 16 is equal or greater than the departure day range, the same algorithm can be applied with exchanged indicated stay duration and indicated departure day range, and thus exchanged s and d).

As an example, the re-computation controller 2 requests the computation machine 3 to re-compute a particular share for the next 31 departure days with a stay duration range of 16 (i.e., all stay durations from 1 to 16 days). Hence, overall, a square of 31·16=496 pre-computed query results has to be re-computed. The computation platform has enough computation resources of re-computing 50 pre-computed query results per computation cycle.

The naive solution mentioned above would yield a re-computation number of 7d·7s=49 which would result in 8 slices of 7d·7s, as well as 7 non-full slices, namely 4 slices of 2d·7s, 2 slices of 7d·4s, and one final slice of 2d·4s, in order to complete re-compute all 496 pre-computed query results. The average re-computation number over these 15 computation cycles is only 33. The more sophisticated approach outlined above leads to a split of 6d·8s. This results in 12 slices, namely 11 slices of 6d·8s and one remaining non-full slice of 1d·7s, and an overall average re-computation number of 41.

The above approach can be generalized to other use-cases with the pre-computed query results having other dimensions or a different number of dimensions (e.g., three dimensions).

Figure 10:
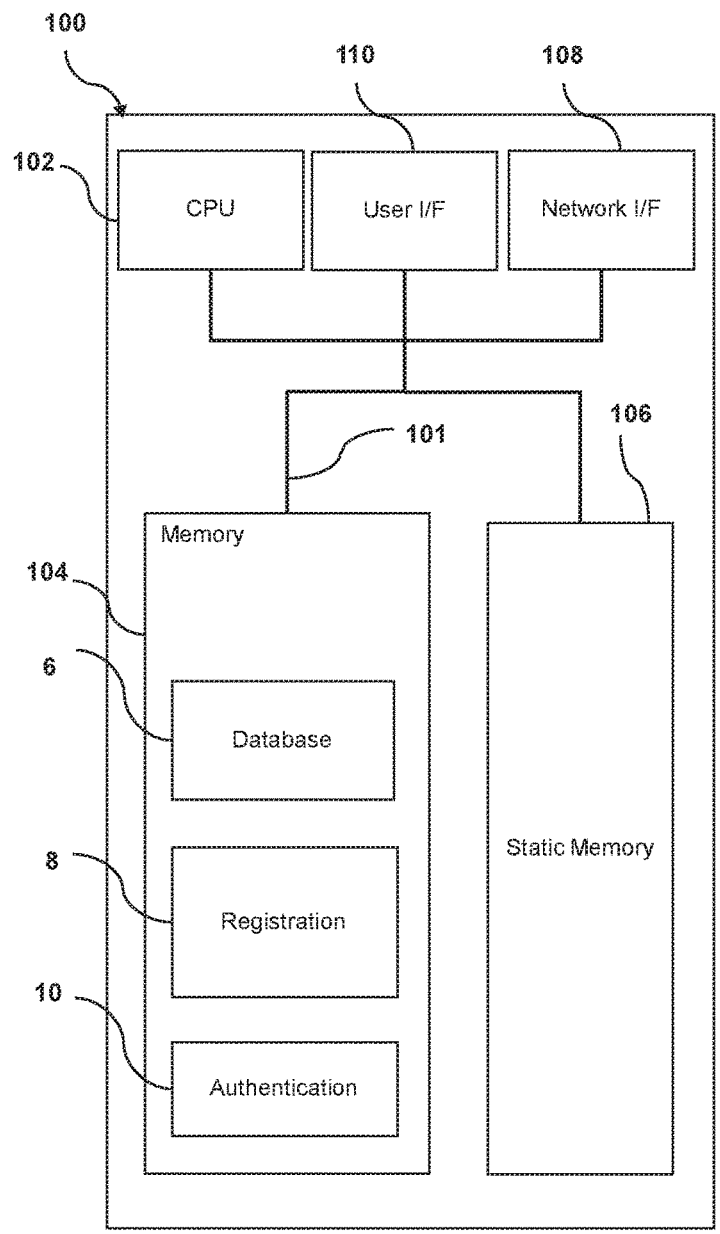
FIG. 10 is an exemplary schematic view of the internal architecture of the database table and/or a request client.

Finally, FIG. 10 is a diagrammatic example representation of a computer system 100 arranged as a computation machine to execute a set of instructions, to cause the computer system 100 to perform any of the methodologies implementing the determination of an optimal re-computation number for a share in order to re-compute an optimal number of pre-computed query results during a computation cycle, as described above. The computer system 100 includes a processor 102, a main memory 104 and a network interface 108 which communicate with each other via a bus 101. The computer system 100 further includes a static memory 106, e.g., non-removable flash and/or solid state drive and/or a removable Micro or Mini SD card, which permanently stores the instructions enabling the computer system 100 to execute its functions, in particular executing the Reinforcement Learning algorithm to select the re-computation number in response to receive a computation trigger 16. Furthermore, the computer system 100 may include a user interface 110 supported by a corresponding user interface control module.

In some examples, the instructions programmed to carry out the routines to determine the re-computation number are also stored on the static memory 106. When the instructions are executed, process data resides in the main memory 104 and/or the processor 102. The instructions may further be transmitted or received as a propagated signal through the network interface device 108 from/to a software server within a local area network or the Internet. The network interface device 108 may be a wireless network interface (such as a Wi-Fi and/or Bluetooth interface) and/or a 2G/3G/4G/5G mobile network interface.

The mechanisms to determine an optimal re-computation number described herein increase the efficiency of re-computing pre-computed query results which are composed of a plurality of shares with a respective certain number of pre-computed query results, wherein computation resources of the computation machine needed to re-compute a pre-computed query result of a first share depend on whether or not other pre-computed query results of the first share are re-computed during a given time interval forming a current re-computation cycle. Using a Reinforcement Learning algorithm in the manner described above optimizes the usage of the computation resources of the computation machine 3 by allowing to re-compute more pre-computed query results with the same amount of computation resources than without the algorithm. The mechanisms are independent from the particular use case of the computation machine and may be employed by any system which re-computes pre-computed query results having an interdependency in terms of the computation resources required to re-compute them, as exemplarily described above with reference to the example of FIG. 3.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which are inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a communication network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A computation machine for re-computing pre-computed query results stored at a database server, the pre-computed query results composed of a plurality of shares, each share including a certain number of pre-computed query results, and wherein computation resources of the computation machine needed to re-compute a pre-computed query result of a first share depend on whether or not other pre-computed query results of the first share are re-computed during a given time interval forming a current re-computation cycle, the computation machine comprising:
one or more processors; and
a memory coupled with the one or more processors, the memory including program code that, when executed by the one or more processors, cause the computation machine to:
receive a request to dynamically re-compute the pre-computed query results of the first share;
retrieve, from a statistics server, an indication of the pre-computed query results of the first share which have been re-computed in a previous time interval;
determine, based on the pre-computed query results of the first share which have been re-computed in the previous time interval, a number of pre-computed query results in the first share to be re-computed in the current re-computation cycle based on a Reinforcement Learning algorithm by applying an exploitation mode of the Reinforcement Learning algorithm or applying an exploration mode of the Reinforcement Learning algorithm based on a value function of the Reinforcement Learning algorithm for the number of pre-computed query results indicated by the retrieved indication, wherein the determined number of pre-computed query results is limited by the computation resources of the computation machine available during the given time interval, wherein the query results are limited based on an application of the exploitation mode or an application of the exploration mode of the Reinforcement Learning algorithm, wherein the value function is computed iteratively from a history of previously received rewards and is based on a learning speed parameter and a degradation factor;
store the determined number of pre-computed query results in the first share in the statistics server for a subsequent determination of the number of pre-computed query results to be re-computed in a subsequent computation cycle;
re-compute the determined number of pre-computed query results in the first share during the current re-computation cycle; and
provide the re-computed determined number of pre-computed query results in the first share to the database server.

2. The computation machine of claim 1 wherein the request to dynamically re-compute the pre-computed query results of the first share indicates the pre-computed query results of the first share which are to be re-computed, and the computation machine is arranged to determine the number of the pre-computed query results in the first share to be re-computed based on the indicated pre-computed query results of the first share.

3. The computation machine of claim 1 wherein the program code causes the computation machine to determine the number of pre-computed query results in the first share to be re-computed by causing the computation machine to:
in response to determining to apply the exploitation mode, determining the number of pre-computed query results in the first share to be re-computed in the current re-computation cycle based on the value function of the Reinforcement Learning algorithm for the number of pre-computed query results indicated by the retrieved indication, the value function associating possible selections of the pre-computed query results in the first share for re-computation with respective estimated rewards.

4. The computation machine of claim 3 wherein the estimated rewards associated by the value function are specified by a reward function of the Reinforcement Learning algorithm which attributes an aggregated value of a plurality of key performance indicators to a corresponding selection of pre-computed query results of the first share.

5. The computation machine of claim 4 wherein the aggregated value of the plurality of key performance indicators is based on a sum of numbers of the pre-computed query results to be re-computed, elapsed time of re-computing the pre-computed query results to be re-computed in the given time interval, maximum computation resources to re-compute the pre-computed query results indicated in the request, a maximum of memory required to re-compute the pre-computed query results indicated in the request, or a combination thereof.

6. The computation machine of claim 4 wherein the program code causes the computation machine to determine to apply the exploitation mode of the Reinforcement Learning algorithm or to apply the exploration mode of the Reinforcement Learning algorithm by causing the computation machine to:
  determine a reward given by the value function for the pre-computed query results indicated by the retrieved indication;
  determine a number of re-computation cycles to apply the exploitation mode of the Reinforcement Learning algorithm based on a comparison of the determined reward with a reward threshold; and
  apply the exploitation mode of the Reinforcement Learning algorithm during the current re-computation cycle and subsequent re-computation cycles given by the determined number of re-computation cycles.

7. The computation machine of claim 6 wherein the reward threshold is defined by given percentages of threshold values of respective ones of the plurality of key performance indicators for which re-computation during the given time interval would result in an error state of the computation machine.

8. The computation machine of claim 6 wherein the program code causes the computation machine to:
  in response to determining to apply the exploration mode, iteratively adapt the number of pre-computed query results indicated by the retrieved indication at least based on the number of pre-computed query results indicated by the retrieved indication, the value function of the Reinforcement Learning algorithm for the number of pre-computed query results indicated by the retrieved indication and the reward threshold.

9. A method for re-computing pre-computed query results stored at a database server, the pre-computed query results composed of a plurality of shares, each share including a certain number of pre-computed query results, and wherein computation resources of a computation machine needed to re-compute a pre-computed query result of a first share depend on whether or not other pre-computed query results of the first share are re-computed during a given time interval forming a current re-computation cycle, the method comprising:
  receiving, at the computation machine, a request to dynamically re-compute the pre-computed query results of the first share;
  retrieving, from a statistics server, an indication of the pre-computed query results of the first share which have been re-computed in a previous time interval;
  determining, by the computation machine and based on the pre-computed query results of the first share which have been re-computed in the previous time interval, a number of pre-computed query results in the first share to be re-computed in the current re-computation cycle based on a Reinforcement Learning algorithm by applying an exploitation mode of the Reinforcement Learning algorithm or applying an exploration mode of the Reinforcement Learning algorithm based on a value function of the Reinforcement Learning algorithm for the number of pre-computed query results indicated by the retrieved indication, wherein the determined number of pre-computed query results is limited by the computation resources of the computation machine available during the given time interval, wherein the query results are limited based on an application of the exploitation mode or an application of the exploration mode of the Reinforcement Learning algorithm, wherein the value function is computed iteratively from a history of previously received rewards and is based on a learning speed parameter and a degradation factor;
  storing, by the computation machine, the determined number of pre-computed query results in the first share in the statistics server for a subsequent determination of the number of pre-computed query results to be re-computed in a subsequent computation cycle;
  re-computing, by the computation machine, the determined number of pre-computed query results in the first share during the current re-computation cycle; and
  providing, by the computation machine, the re-computed determined number of pre-computed query results in the first share to the database server.

10. The method of claim 9 wherein the request to dynamically re-compute the pre-computed query results of the first share indicates the pre-computed query results of the first share which are to be re-computed, and the computation machine is arranged to determine the number of pre-computed query results in the first share to be re-computed based on the indicated pre-computed query results of the first share.

11. The method of claim 9 wherein determining the number of pre-computed query results in the first share to be re-computed comprises:
  in response to determining to apply the exploitation mode, determining the number of pre-computed query results in the first share to be re-computed in the current re-computation cycle based on the value function of the Reinforcement Learning algorithm for the number of pre-computed query results indicated by the retrieved indication, the value function associating possible selections of the pre-computed query results in the first share for re-computation with respective estimated rewards.

12. The method of claim 11 wherein the estimated rewards associated by the value function are specified by a reward function of the Reinforcement Learning algorithm which attributes an aggregated value of a plurality of key performance indicators to a corresponding selection of pre-computed query results of the first share.

13. The method of claim 12 wherein the aggregated value of the plurality of key performance indicators is based on a sum of numbers of the pre-computed query results to be re-computed, elapsed time of re-computing the pre-computed query results to be re-computed in the given time interval, maximum computation resources to re-compute the pre-computed query results indicated in the request, a maximum of memory required to re-compute the pre-computed query results indicated in the request, or a combination thereof.

14. The method of claim 12 wherein determining to apply the exploitation mode of the Reinforcement Learning algorithm or to apply the exploration mode of the Reinforcement Learning algorithm comprises:

determining a reward given by the value function for the pre-computed query results indicated by the retrieved indication;

determining a number of re-computation cycles to apply the exploitation mode of the Reinforcement Learning algorithm based on a comparison of the determined reward with a reward threshold; and applying the exploitation mode of the Reinforcement Learning algorithm during the current re-computation cycle and subsequent re-computation cycles given by the determined number of re-computation cycles.

15. The method of claim 14 wherein the reward threshold is defined by given percentages of threshold values of respective ones of the plurality of key performance indicators for which re-computation during the given time interval would result in an error state of the computation machine.

16. A computer program product for re-computing pre-computed query results stored at a database server, the pre-computed query results composed of a plurality of shares, each share including a certain number of pre-computed query results, and wherein computation resources of a computation machine needed to re-compute a pre-computed query result of a first share depend on whether or not other pre-computed query results of the first share are re-computed during a given time interval forming a current re-computation cycle, the computer program product comprising:

a non-transitory computer-readable storage medium; and instructions stored on the non-transitory computer-readable storage medium that, when executed by one or more processors of the computation machine, cause the one or more processors to:

receive a request to dynamically re-compute the pre-computed query results of the first share;

retrieve, from a statistics server, an indication of the pre-computed query results of the first share which have been re-computed in a previous time interval;

determine, based on the pre-computed query results of the first share which have been re-computed in the previous time interval, a number of pre-computed query results in the first share to be re-computed in the current re-computation cycle based on a Reinforcement Learning algorithm by applying an exploitation mode of the Reinforcement Learning algorithm or applying an exploration mode of the Reinforcement Learning algorithm based on a value function of the Reinforcement Learning algorithm for the number of pre-computed query results indicated by the retrieved indication, wherein the determined number of pre-computed query results is limited by the computation resources of the computation machine available during the given time interval, wherein the query results are limited based on an application of the exploitation mode or an application of the exploration mode of the Reinforcement Learning algorithm, wherein the value function is computed iteratively from a history of previously received rewards and is based on a learning speed parameter and a degradation factor;

store the determined number of pre-computed query results in the first share in the statistics server for a subsequent determination of the number of pre-computed query results to be re-computed in a subsequent computation cycle;

re-compute the determined number of pre-computed query results in the first share during the current re-computation cycle; and provide the re-computed determined number of pre-computed query results in the first share to the database server.

\* \* \* \* \*